United States Patent
Schwaegerl et al.

(10) Patent No.: US 9,296,049 B2
(45) Date of Patent: Mar. 29, 2016

(54) COUPLING POINT FOR A MODULAR ROTARY TOOL AND TOOL HEAD CARRIER FOR A MODULAR ROTARY TOOL

(71) Applicant: KENNAMETAL, INC., Latrobe, PA (US)

(72) Inventors: Juergen Schwaegerl, Vohenstrauss (DE); Herbert Rudolf Kauper, Erlangen (DE)

(73) Assignee: KENNAMETAL INC., Latrobe, PA (US)

( * ) Notice: Subject to any disclaimer, the term of this patent is extended or adjusted under 35 U.S.C. 154(b) by 390 days.

(21) Appl. No.: 13/939,835

(22) Filed: Jul. 11, 2013

(65) Prior Publication Data

US 2014/0017022 A1    Jan. 16, 2014

(30) Foreign Application Priority Data

Jul. 11, 2012    (DE) .......................... 10 2012 212 146

(51) Int. Cl.
*B23B 51/02*    (2006.01)
*B23B 51/00*    (2006.01)

(52) U.S. Cl.
CPC ................. *B23B 51/00* (2013.01); *B23B 51/02* (2013.01); *B23B 2251/02* (2013.01); *Y10T 408/9098* (2015.01)

(58) Field of Classification Search
CPC  B23B 51/02; B23B 2251/02; B23B 2251/50; Y10T 408/9098; Y10T 408/90993; Y10T 408/9097; Y10T 408/907; Y10T 408/892
USPC .......... 408/144, 226, 227, 230, 231–233, 713
IPC ............................................ B23B 51/00, 51/02
See application file for complete search history.

(56) References Cited

U.S. PATENT DOCUMENTS

| | | | | |
|---|---|---|---|---|
| 5,957,631 A * | 9/1999 | Hecht | ..................... | B23B 51/00 408/144 |
| 6,840,717 B2 * | 1/2005 | Eriksson | ................. | B23B 51/02 408/1 R |
| 7,972,094 B2 * | 7/2011 | Men | ........................ | B23B 51/02 408/226 |
| 8,021,088 B2 * | 9/2011 | Hecht | ..................... | B23B 51/02 408/1 R |
| 2005/0260046 A1 * | 11/2005 | Hecht | ..................... | B23B 51/00 408/31 |
| 2009/0116920 A1 * | 5/2009 | Bae | ........................ | B23B 51/02 408/227 |

FOREIGN PATENT DOCUMENTS

| | | | | |
|---|---|---|---|---|
| WO | 03/070408 A1 | 8/2003 | | |
| WO | WO 2008099378 A1 * | 8/2008 | ............. | B23B 51/02 |
| WO | WO 2011065901 A1 * | 6/2011 | ............. | B23B 51/02 |

* cited by examiner

*Primary Examiner* — Daniel Howell
(74) *Attorney, Agent, or Firm* — Larry R. Meenan

(57) ABSTRACT

A coupling point for a modular rotary which extends in an axial direction. The coupling point includes a first coupling part disposed on a tool head and a second coupling part disposed on a carrier. The coupling parts can be coupled to one another by bidirectional rotation with the formation of an interference fit which acts in the radial direction. Each coupling part includes two coupling faces which lie opposite one another and have contact regions in which the interference fit is formed. In the first coupling part, at least one of the coupling faces has at least two contact regions which are spaced apart from one another in the circumferential direction, and, to this end, at least one first clearance portion is formed between the contact regions, in which clearance portion the two coupling parts do not bear against one another in the coupled state.

11 Claims, 3 Drawing Sheets

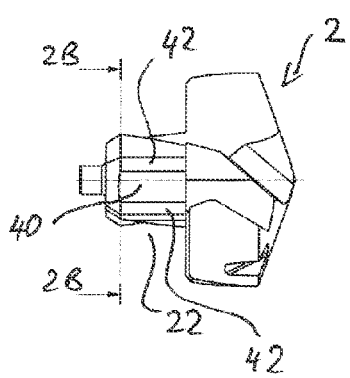
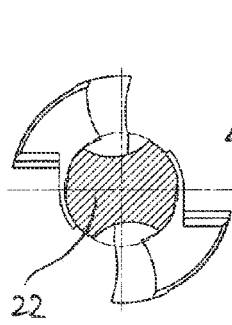
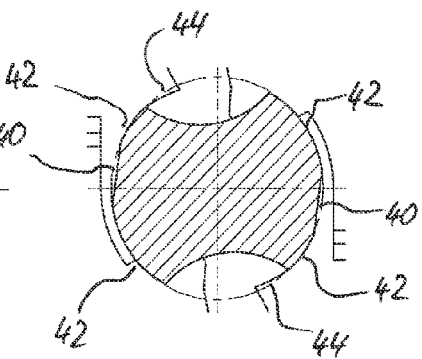
Fig 2A　　　　Fig 2B　　　　Fig 2C
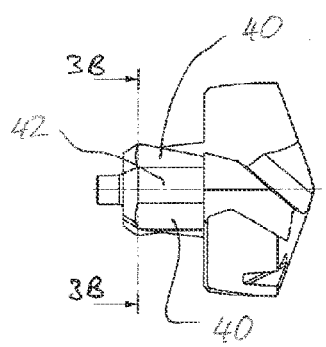
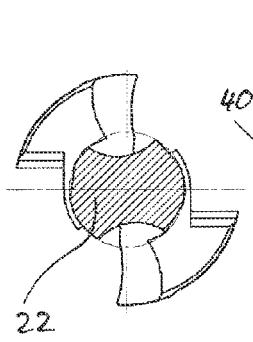
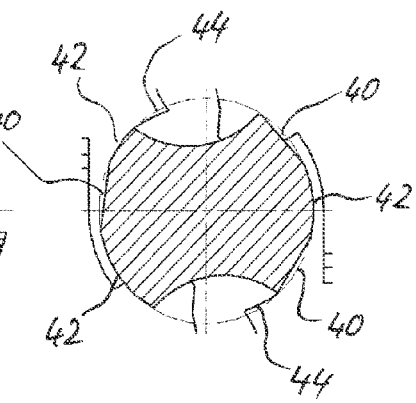
Fig 3A　　　　Fig 3B　　　　Fig 3C
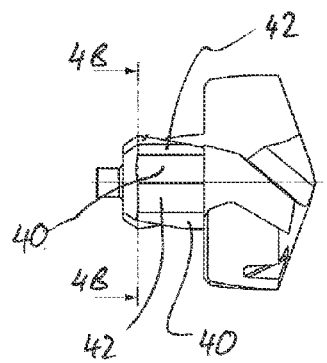
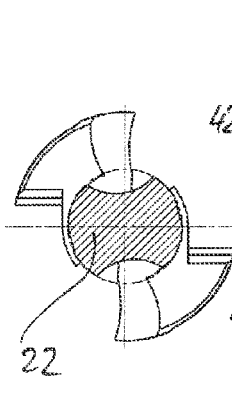
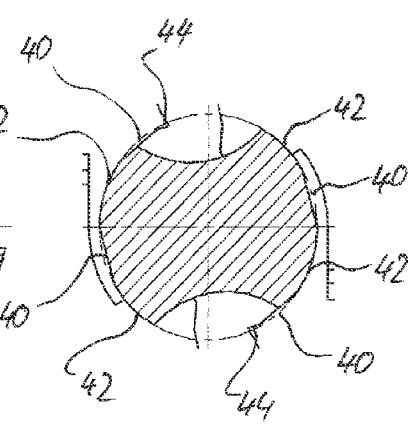
Fig 4A　　　　Fig 4B　　　　Fig 4C

COUPLING POINT FOR A MODULAR ROTARY TOOL AND TOOL HEAD CARRIER FOR A MODULAR ROTARY TOOL

BACKGROUND

1. Field of the Invention

The invention relates to a coupling point for a modular rotary tool which extends in the axial direction, in particular a drilling tool having a carrier and having a tool head which is inserted therein. Furthermore, the invention relates to a tool head and to a carrier for a modular rotary tool of this type.

2. Background Information

A rotary tool of the type having a coupling point can be gathered from EP 1 476 269 B1. A rotary tool is understood generally to mean a tool for machining materials with the removal of chips, which tool is used for workpiece machining such that it rotates about its own rotational axis which extends in the axial direction. In the drilling tool which is known from EP 1 476 269 B1, the tool head is inserted exclusively in a clamping manner in the carrier. To this end, the carrier has two clamping webs which lie approximately opposite one another and exert a radial clamping force on the tool head. The tool head is clamped by way of the clamping webs by a rotation approximately by 90°. Here, mutually corresponding coupling faces of the tool head and the carrier come into contact at usually linear contact regions. The fastening of the tool head takes place via the radial clamping force which is exerted in said contact regions, as a consequence of an interference fit between the tool head and the carrier.

SUMMARY OF THE INVENTION

Embodiments of the present invention provide an improved fit of two coupling parts, in particular of a tool head in a carrier. As claimed in the invention, such improvement is achieved by a coupling point having the features of claim 1 and by way of a tool head having the features of claim 9 and by way of a carrier having the features of claim 10. The advantages which are described with regard to the coupling point and preferred refinements can also be transferred analogously to the tool head and/or the carrier.

The coupling point serves generally for the clamping connection between a carrier and a tool head which is inserted therein. Here, the coupling point comprises a first coupling part and a second coupling part which can be coupled to one another by bidirectional rotation with the formation of an interference fit which acts in the radial direction. Each coupling part has two coupling faces which lie opposite one another and have contact regions, in which the interference fit is formed. The first coupling part is, for example, a constituent part of the tool head and the second coupling part is a constituent part of the carrier, or vice versa. The relative interaction of the two coupling parts is decisive.

In order to improve the force fit, it is provided that, at least in the first coupling part, at least one of the two coupling faces has at least two contact regions which are spaced apart from one another in the circumferential direction, a first clearance portion being formed between the contact regions in order to form said contact regions, in which first clearance portion the two coupling parts do not bear against one another in the coupled state. The first clearance portion is preferably formed merely in one coupling part.

As a result of this measure, at least one coupling face is therefore divided, with the result that a plurality of contact regions are produced within a coupling face for a contact (interference fit) which is, in particular, linear and extends in the axial direction. A decisive advantage is therefore achieved that, in comparison with the known conventional coupling, at least one three-point or three-line contact is formed, with the result that the stability of the coupling connection is improved overall.

This refinement is based on the finding that, in the conventional coupling, a clamping action is formed merely on two contact lines which lie substantially opposite one another and extend in the axial direction, which could lead to loosening of the coupling connection in certain operating situations; in particular, if the tool is configured as a drilling tool and is guided out of the drilled hole again in the case of a blind bore. This merely linear contact at two contact lines which lie opposite one another also leads to it being possible for the two coupling parts to tilt slightly with respect to one another.

These disadvantages are avoided in a particularly simple way by the interruption of at least one of the coupling faces and the production of a plurality of contact regions per coupling face, without it being necessary to modify in principle the basic and proven design of the coupling geometry which can be gathered from EP 1 476 269 B1. Apart from the modifications which are described herein, the carrier and the tool head are therefore preferably configured at least largely identically to the refinements which are described in EP 1 476 269 B1. Reference is therefore made to this extent to said description.

The coupling faces of a respective coupling part in each case form a pair which lies opposite one another. Further coupling faces are therefore not provided. The coupling faces are usually arranged such that they are offset rotationally with respect to one another in each case by 180° about the rotational axis. In each case one flute is preferably formed between the coupling faces, preferably both in the carrier and in the tool head.

For the production of the interference fit which acts in the radial direction, the inner coupling part usually has an excessive dimension in its maximum external diameter in comparison with the internal diameter of the outer coupling part. In addition to the force fit, no further fastening variants are preferably provided, such as a screw fastening, etc. Accordingly, for a simple exchange of a worn tool head, the latter can be released from the carrier by being rotated and pulled out of the latter.

A clearance portion between the two contact regions is generally understood to mean a surface region of the coupling faces which is recessed in the radial direction, with the result that the two contact regions which are formed by the clearance portion project in the radial direction.

With regard to simple production of the two coupling parts, the contact regions of at least one and preferably both coupling parts lie on a circular arc line. A refinement of the respective coupling part which is circular as viewed in cross section can be made possible in a simple way in terms of production technology by grinding. In the first step, the coupling part, for example a fastening pin of the tool, is therefore ground cylindrically, the clearance portion subsequently being introduced (ground) into the circularly ground coupling part.

For simple introduction into the complementary coupling part by the relative rotation of the two parts with respect to one another, at least one of the two coupling parts is provided with an insertion bevel or an insertion chamfer on its front edge. Front edge is understood to mean the end-side section of the coupling face which leads in the rotational direction during rotation of the coupling parts during insertion.

As an alternative or in addition, the two coupling parts can also combine different cross-sectional geometries, for example a circular cross-sectional area with an elliptical cross-sectional area, with the result that simple rotation with respect to one another is made possible.

In one preferred refinement, precisely three contact regions are formed around the stated circumference. This leads to a satisfactory clamping connection with defined contact regions, since there is no dimensional redundancy.

As an alternative to this, each of the two coupling faces, which lie opposite one another, of the at least one coupling part has two contact regions with a clearance portion which is arranged between them. At least and preferably precisely four contact regions are therefore formed as a result. Said contact regions are preferably arranged in pairs so as to lie opposite one another in each case by 180°. This opposed arrangement is advantageous in terms of production technology. Since a high dimensional accuracy is important for the formation of the desired interference fit, measuring of the contact regions with regard to their radial position is namely required during production, which is possible in a simple way in the case of this geometry.

As claimed in one expedient development, the contact regions are also divided in the axial direction by the arrangement of a second clearance portion, with the result that a respective contact region is formed by at least two part contact regions which are spaced apart axially from one another, namely a front part contact region which faces a tool tip and a rear part contact region which faces a carrier shank. This measure then provides a plurality of defined bearing points, not only in the circumferential direction but also in the axial direction, with the result that an improved clamping fastening action is also achieved in the axial direction. There is the possibility in principle to form the first clearance portion on the first coupling part and the second clearance portion on the second coupling part. However, the two clearance portions are preferably formed on the same coupling part.

Here, the second clearance portion is expediently formed by a groove which extends in the circumferential direction.

The carrier, as the one coupling part, preferably has two clamping webs which are separated from one another by flutes and have free end sides which are also not covered by the tool head when the latter is inserted. In alternative refinements, the tool head can also completely cover the clamping webs in the axial direction.

In general, the clamping webs are spread radially somewhat in an elastic manner during the formation of the clamping connection between the two coupling parts. On account of their free end, the front part region is spread to a somewhat more pronounced extent here than the rear part region which is connected to the carrier. In order to achieve a high clamping force on all contact points which is as identically large as possible, in one expedient development the front part contact region is offset radially to the outside in the direction of the other coupling part with regard to the rear part contact region. This is understood to mean that, in the case of the inner coupling part (clamping pin of the tool head), the front part contact region lies radially on a position which lies further to the outside (in relation to the rotational axis) than the rear part region. In the case of an outer coupling part (carrier with the clamping webs), it is the other way around and the front part contact region is offset radially to the outside (that is to say, directed away from the normal coupling face) to such an extent that its spacing from the rotational axis is smaller than in the case of the rear part contact region.

This refinement therefore counteracts elastic radial spreading overall in the fork-shaped clamping webs and compensates for said spreading.

In one preferred refinement, the coupling faces and therefore also the contact regions run parallel to the axial direction. The two coupling parts are therefore preferably at least substantially cylindrical elements, that is to say a substantially cylindrical fastening pin on the side of the tool head and a substantially cylindrical receptacle on the side of the carrier.

As an alternative to this, the coupling faces are arranged such that they are inclined with respect to one another with regard to the rotational axis, with the result that the coupling faces in each case form a section of a cone lateral surface with the rotational axis as the cone axis. In refinements of this type, during rotation of the two coupling parts, a positively locking connection which acts in the axial direction is formed in the manner of a dovetail connection. It is also the case in this design variant that the front part contact region is offset radially to the outside with regard to the rear part contact region; the course of the cone lateral surface is to be understood as reference line in the axial direction for the radial offset. That is to say, the front part contact region is offset radially to the outside with regard to a cone lateral section which is extended from the rear part contact region, in order to compensate for the radial spreading of the clamping webs.

In one preferred refinement, the first coupling part with the contact regions which are formed by the first and preferably also by the second clearance portion and with part contact regions is formed on the tool head. In this case, the first coupling part is therefore a fastening pin which is arranged on the tool head. Accordingly, in a manner which corresponds to this, the second coupling part is formed on the carrier, to be precise, in particular, as a pin receptacle for the fastening pin. As claimed in one preferred alternative, the first and/or the second clearance portion is formed in the region of the pin receptacle. This measure fixes the contact points in the region of the pin receptacle via the machining of the respective clearance portion. As a result, said contact points are always at a defined position, even in the case of a multiple change of the tool head. In the case of an arrangement of the clearance portion exclusively on the fastening pins of the carrier, there is the possibility that the contact regions are at different axial and/or circumferential positions as a result of tolerance fluctuations in different tool heads, with the result that the clamping capability of the carrier can deteriorate in the case of repeated replacement of the tool head as a consequence of wear.

BRIEF DESCRIPTION OF THE ACCOMPANYING FIGURES

In the following text, exemplary embodiments of the invention will be explained in greater detail using the figures, in wherein like reference numerals represent like elements and in which:

FIG. 2A shows a tool head in a side view a first design variant;

FIG. 2B shows a sectional view in accordance with the line 2B-2B in FIG. 2A;

FIG. 2C shows an enlarged illustration of FIG. 2B in the region of the fastening pin;

FIGS. 3A-3C show a second design variant of the tool head with the views in accordance with FIGS. 2A-2C;

FIGS. 4A-4C show a third design variant of a tool head with the views in accordance with FIG. 2A-2C;

Figure 1A:
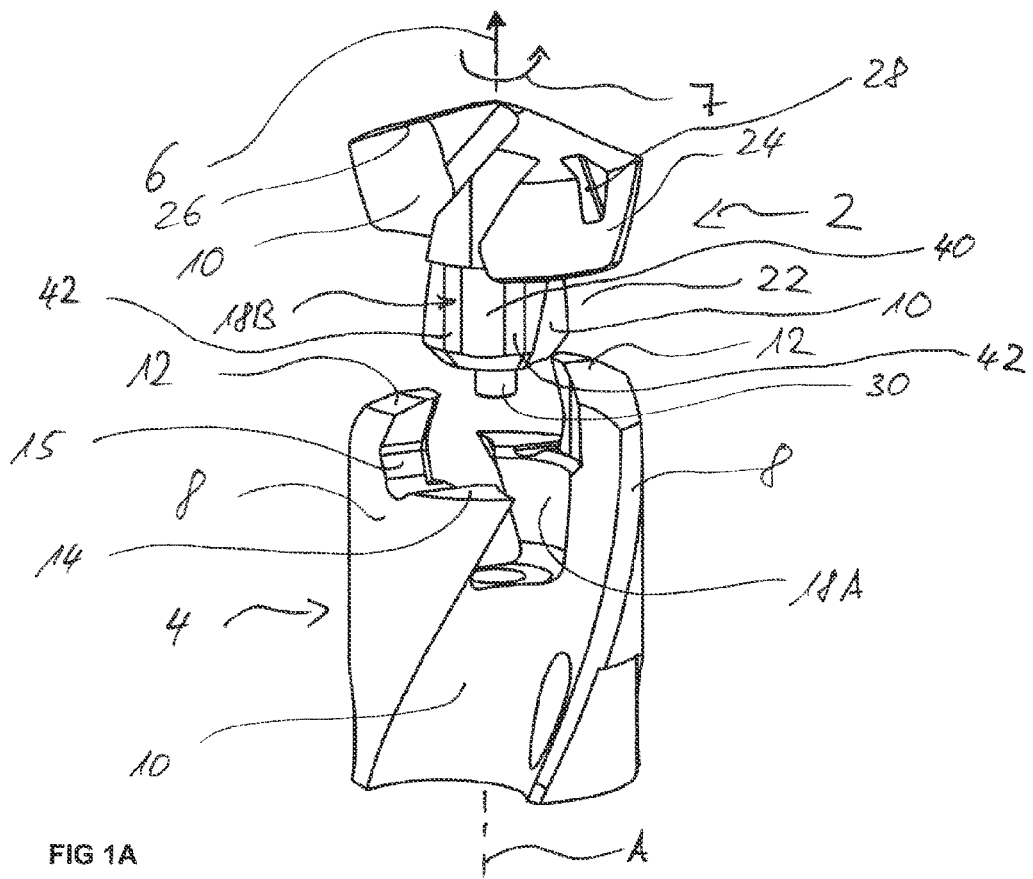
FIGS. 1A and 1B show a drilling tool with a carrier, details of which are shown, and a tool head in an exploded illustration before the two coupling parts are joined together (FIG. 1A) and in the final mounted position (FIG. 1B)

The figures depict embodiments of the disclosure for purposes of illustration only. One skilled in the art will readily recognize from the following description that alternative embodiments of the structures and methods illustrated herein may be employed without departing from the principles of the disclosure described herein.

DESCRIPTION OF EXEMPLARY EMBODIMENTS

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The coupling point will be described using a modular drilling tool. The latter has a tool head 2 and a carrier 4. The tool head 2 and carrier 4 extend in the axial direction 6 and in each case form a body which is rotationally symmetrical with regard to a rotational axis A. The rotational axis A extends in the axial direction 6. During operation, the drilling tool rotates in the rotational direction 7. On its front end side, the carrier 4 which is shown in detail having two clamping webs 8 which lie opposite one another and are separated from one another by in each case one flute 10. In the rear region, the carrier has a clamping stem (not shown in greater detail here) for clamping into a machine tool.

The two clamping webs 8 extend in the axial direction 6 in each case approximately in a fork-shaped manner towards the tool head 2. They are of step-shaped configuration and have a front free end side 12 which merges with the formation of a step into a support face 14 which runs, in particular, horizontally. The respective clamping webs 8 are formed on the carrier 4 on the circumferential side on the outside. When the tool head 2 is inserted, the free end sides 12 are uncovered by the tool head, whereas the latter rests with a flat underside on the support faces 14. Furthermore, the clamping webs 8 have stop faces 15 which are oriented approximately perpendicularly with respect to the circumferential direction, additionally extend approximately in the axial direction 6 and serve to transmit torque during operation.

A receptacle for the tool head 2 is formed between the clamping webs 8. Starting from the support face 14, the carrier 14 has a pin receptacle 16 which extends counter to the axial direction 6. As a result of the interruption by the flutes 10, said pin receptacle 16 has merely part circumferential faces which are preferably cylindrical part faces. Said part circumferential faces in each case form coupling faces 18A of the pin receptacle 16.

The tool head 2 is configured for clamping fastening in the pin receptacle 16 of the carrier 4. Accordingly, it has a fastening pin 22 which has coupling faces 18B which likewise lie opposite one another on the circumferential side. In the exemplary embodiment, they are likewise separated from one another by recesses for the flute 10. In the exemplary embodiment, the fastening pin 22 has a cylindrical geometry. In the axial direction 6, the fastening pin 22 is adjoined by the actual head part 24 with cutting edges 26. In the exemplary embodiment, the head part 24 has an end face which is approximately in the shape of a cone lateral surface, the individual face sections in each case forming free faces to the cutting edges 26. The flutes 10 are guided further in the tool head 2. Furthermore, a tool receptacle 28 for a mounting tool to act on for exchanging the tool head 2 can be seen on the outer circumference.

Counter to the axial direction 6, the fastening pin 22 is also adjoined by a centering pin 30 which is not clamped, however.

In order to insert the tool head 2 into the carrier 4, the tool head 2 is first of all introduced into the receptacle on the carrier 4 counter to the axial direction 6, with the result that the fastening pin 22 is introduced into the pin receptacle 16. Here, the tool head 2 is rotated somewhat in the rotational direction 7 with respect to its final position in the inserted state, for example by approximately 90°. As a result, the coupling faces 18B of the fastening pin 22 lie in the regions of the pin receptacle 16 which are cut free by the flute 10. Subsequently, the tool head 2 is rotated counter to the rotational direction relative to the carrier 4, until it comes into contact with the circumferential-side stop faces 15. During this rotation, an interference fit which acts in the radial direction is formed between the coupling faces 18A, 18B. Further fastening means are not provided.

The basic construction, described here, of the carrier 4 and of the tool head 2 corresponds substantially to the refinement of the exemplary embodiment, described with respect to FIGS. 1 to 5, in accordance with EP 1 476 269 B1, to which reference is made here and the description of which is incorporated. As an alternative, the basic geometry can also be configured like the exemplary embodiment, as is described with respect to FIGS. 8 to 10 of EP 1 476 269 B1.

Instead of the substantially cylindrical configuration of the fastening pin 22 and of the pin receptacle 16, a type of dovetail connection is also possible. In particular, a coupling geometry is provided as an alternative refinement, as is described in the previously unpublished German application with the official file reference 10 2012 200 690.7. The disclosure of this application is to this extent incorporated herein.

In the design variants which are described here, one substantial distinguishing feature with respect to said known geometries is to be seen in principle in the fact that at least one of the coupling faces 18A, 18B is interrupted by a first clearance portion 40, with the result that two contact regions 42 are formed on both sides of said first clearance portion 40, at which contact regions 42 the radial interference fit is formed. Here, the first clearance portion 40 extends in the axial direction 6 and is formed by a face section which is recessed radially in comparison with the contact regions 42, with the result that the contact points between the coupling faces 18A, 18B lie in a defined manner within the two contact regions 42.

Figure 1B:
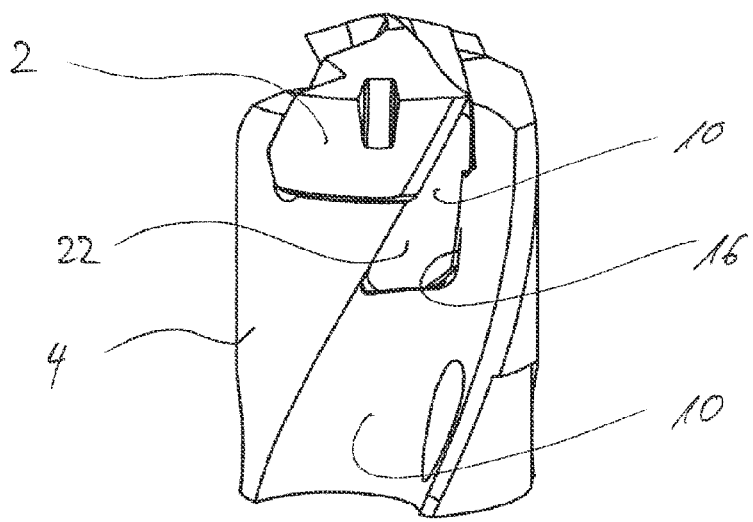

In the exemplary embodiment of FIGS. 1A, 1B, the first clearance portion 40 is formed on the fastening pin 22. In contrast, the pin receptacle 16 has no clearance portion 40 at all. The corresponding coupling face 18A is therefore uninterrupted and is, in particular, a cylindrical part circumferential face.

Different design variants of the configuration of the contact regions 42 on the fastening pin 22 result in conjunction with FIGS. 2A to 2C, 3A to 3C and 4A to 4C.

In the refinement as claimed in FIGS. 2A to 2C, a total of two first clearance portions 40 and, accordingly, four contact regions 42 are formed. The corresponding face regions are arranged so as to lie opposite one another in each case approximately by 180°. The fastening pin 22 is substantially cylindrical and is formed in terms of production technology by cylindrical grinding, in each case one flattening operation being performed by grinding subsequently to the formation of the faces for the two first clearance portions 40 which lie opposite one another.

The idealized circular form is shown by a dashed line, and the clearance portions 40 are recessed radially with respect to said circular line.

Furthermore, as can be gathered, in particular, from the enlarged illustration in accordance with FIG. 2C, an insertion bevel 44 is formed at least on a front edge of the coupling face 18B, in order to ensure easy screwing of the tool head 2 into the carrier 4. The insertion bevel 44 preferably lies on an elliptical line. A respective coupling face 18B preferably runs on both sides along an elliptical line.

The refinement in accordance with FIGS. 2A to 2C is particularly simple to realize in terms of production technology, since the dimensional accuracy can be monitored in a simple way using measuring technology as a result of the contact regions 42 which lie opposite one another.

In the design variant of FIGS. 3A to 3C, a total of three contact regions 42 are formed, which affords advantages in comparison with the dimensional redundancy with four contact regions 42 with regard to the reliability of the clamping connection. In order to form the three contact regions 42, the one coupling face 18B (left-hand half of FIG. 3C) is divided into two contact regions 42 approximately centrally by the first clearance portion 40 which is once again a flattened portion. On the second coupling face 18B which lies opposite, in contrast, the central part region of the coupling face 18B is left unmodified and two clearance portions 40 are formed laterally, with the result that a defined central contact region 42 is formed. In principle, a contact region 42 would be formed on the right-hand coupling face 18B independently of the clearance portions 40. However, the contact region 42 is defined in greater detail by the introduction of said flattened portions. It is also the case in this design variant that insertion bevels 44 are once again provided which run radially to the inside in comparison with the optimum circular line.

In the exemplary embodiment of FIGS. 4A to 4C, once again a total of four contact regions 42 are formed, in each case two first clearance portions 40 being formed per coupling face 18B for this purpose by the production of flattened portions. As a result of the defined introduction of flattened portions, the face region, that is to say the circumferential region, on which the contact regions 42 are formed, can be defined in a more precise manner, with the result that the contact regions 42 therefore have a comparatively low circumferential line.

All the tool heads which are described with respect to FIGS. 2A to 2C, 3A to 3C and 4A to 4C are preferably inserted into a carrier 4, as is shown in FIG. 1A, in which therefore the coupling face 18A is uninterrupted and is formed, for example, by cylindrical part circumferential faces.

Figure 5A:
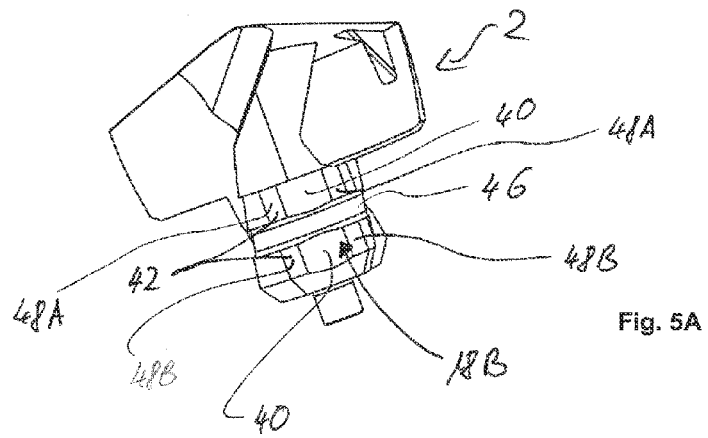
FIG. 5A shows a fourth design variant of a tool head in a perspective illustration.
Figure 5B:
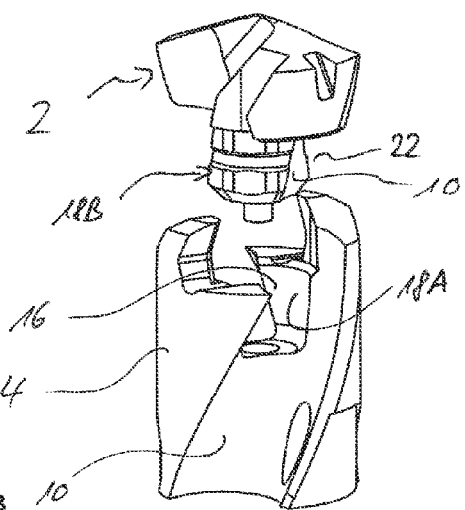
FIG. 5B shows an exploded illustration of a carrier (details of which are shown), with the tool head in accordance with FIG. 5A in a similar manner to FIG. 1A.

In the tool head as claimed in the design variant of FIG. 5A, in addition to at least one first clearance portion 40, a second clearance portion 46 is also arranged which divides each of the coupling faces 18B into an upper and a lower part region substantially horizontally in the manner of a part annular groove. The contact regions 42 which are formed by the first clearance portion 40 are therefore divided into a front part contact region 48A and a rear part contact region 48B. This second clearance portion 46 can be combined with each of the above-described design variants. Once again, for example, the carrier which is shown in FIG. 1A with the uninterrupted coupling faces 18A is used as carrier 4, as is shown in FIG. 5B.

The measure of the additional interruption of the contact regions 42 in the axial direction therefore also achieves contact which is defined in the axial direction and therefore clamping points for a clamping action which is as reliable as possible. In order to compensate for the elastic widening of the two clamping webs 8 which lie opposite one another, which elastic widening takes place during screwing in of the tool head, the front part contact region 48A is preferably offset radially slightly to the outside, in order to achieve the same clamping forces in both part contact regions 48A, 48B.

The second clearance portion 46 runs in each case continuously over the entire coupling face 18B in the circumferential direction and therefore connects the two recesses for the flutes 10.

Figure 6:
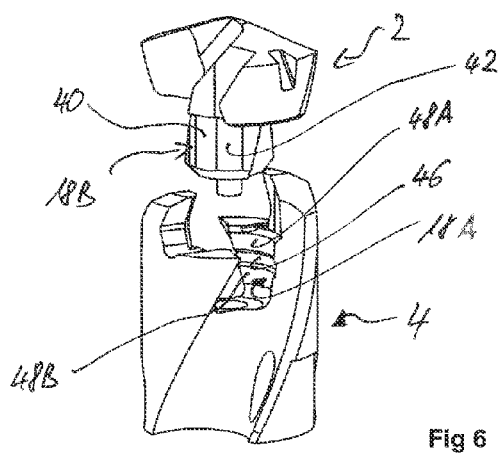
FIG. 6 shows an exploded illustration in a similar manner to FIGS. 5B and 4A with a second design variant of the carrier.

Finally, FIG. 6 shows a further design variant, in which the second clearance portion 46 on the carrier is formed by the introduction of a circumferential groove in the part circumferential faces of the pin receptacle 16. In contrast, the first clearance portion 40 is formed on the fastening pin 22. As a result of these measures, the contact regions 42 are therefore formed on the one coupling part and the part contact regions 48A, 48B are formed on the other coupling part. By the introduction of the clearance portions 40, 46, a contact pattern which is, for example, in the manner of a chessboard and extends both in the circumferential direction and in the axial direction 6 can therefore be produced overall. The clearance portions 40, 46 can optionally be made either on the pin receptacle 16 or the fastening pin 22 or else distributed on said two elements.

The subject of the invention is not limited to the above-described illustrative embodiments. Rather, further embodiments of the invention can be derived from the above description by the person skilled in the art. In particular, those individual features of the invention which are described with reference to the various illustrative embodiments, and the design variants thereof, can also be differently combined with one another.

We claim:

1. A coupling point for a modular rotary tool which extends in an axial direction, the modular rotary tool having a carrier and a tool head inserted in the carrier, the coupling point comprising:
    a first coupling part disposed on the tool head; and
    a second coupling part disposed on the carrier,
        wherein the coupling parts can be coupled to one another by bidirectional rotation with the formation of an interference fit which acts in the radial direction, each coupling part having two coupling faces which lie opposite one another and have contact regions, in which the interference fit is formed, wherein in the first coupling part, at least one of the coupling faces has at least two contact regions which are spaced apart from one another in the circumferential direction, and, to this end, at least one first clearance portion is formed between the contact regions, in which clearance portion the two coupling parts do not bear against one another in the coupled state, and wherein the contact regions are divided in the axial direction by at least one second clearance portion, with the result that a respective contact region is formed by at least two part contact regions which are spaced apart axially from one another.

2. The coupling point of claim 1 wherein the contact regions lie on a circular arc line.

3. The coupling point of claim 1 wherein three contact regions are spaced apart in the circumferential direction.

4. The coupling point of claim 1 wherein each of the coupling faces of the at least one coupling part has two contact regions with a first clearance portion which is arranged between them.

5. The coupling point of claim 1 wherein the second clearance portion is formed by a groove.

6. The coupling point of claim 1 wherein the at least two part contact regions include a front part contact region and a rear part contact region and wherein the front part contact region is offset radially to the outside with regard to the rear part contact region.

7. The coupling point of claim 1 wherein the contact regions run parallel to the axial direction.

8. A tool head for a modular rotary tool having a coupling part for the coupling point of claim 1, having a fastening pin as the first coupling part.

9. A carrier for a modular rotary tool having a coupling part for the coupling point of claim 1, having a pin receptacle as the second coupling part.

10. The carrier of claim 9 wherein the first clearance portion is formed by a recess in an inner wall of the pin receptacle.

11. The carrier of claim 9 wherein the pin receptacle is of a fork-shaped configuration with two clamping webs which lie opposite one another and extend in the axial direction to a free end side, the clamping webs being of step-like configuration with a stop face which is oriented in the circumferential direction.

* * * * *